July 7, 1964
A. G. GRAHAM ETAL
3,139,941
ROW MARKERS
Filed Sept. 21, 1961
2 Sheets-Sheet 1
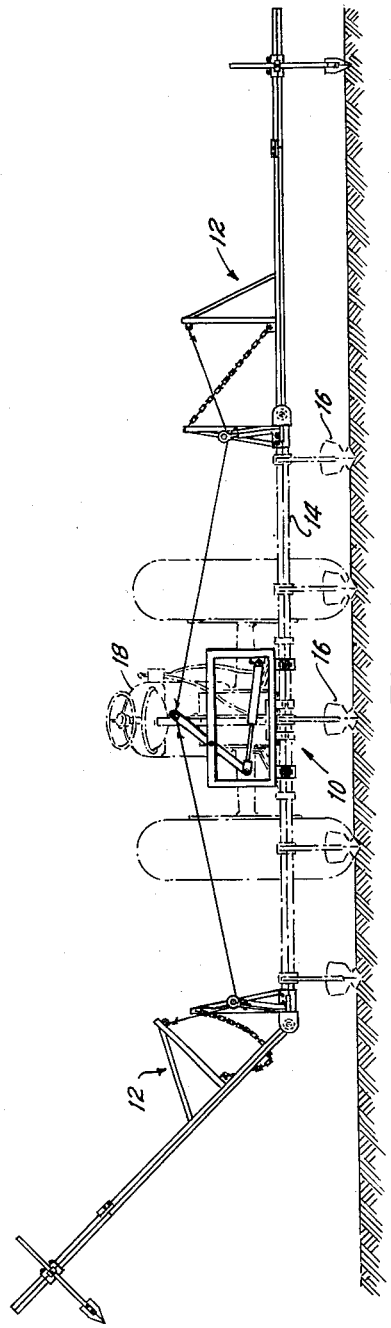
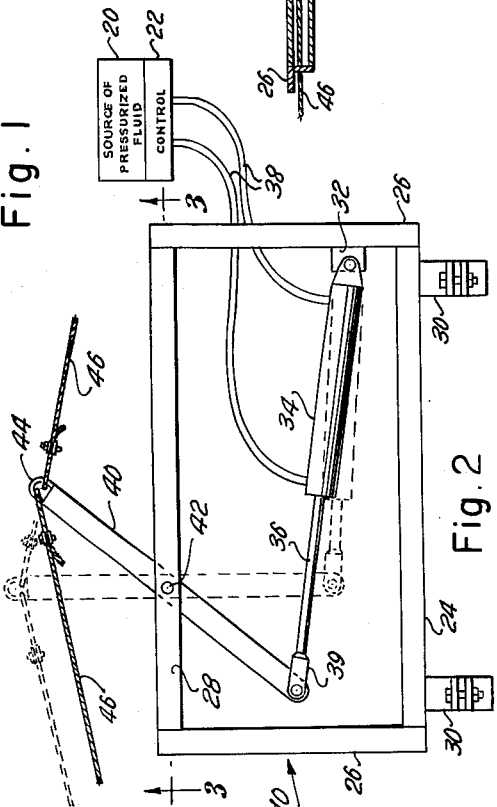
INVENTORS
Arles G. Graham
William J. Smithee
BY
ATTORNEY July 7, 1964

A. G. GRAHAM ETAL 3,139,941

ROW MARKERS

Filed Sept. 21, 1961

INVENTORS
Arles G. Graham
William J. Smithee

BY

ATTORNEY

United States Patent Office 3,139,941
Patented July 7, 1964

3,139,941
ROW MARKERS
Arles G. Graham and William J. Smithee, both of Crosbyton, Tex., assignors to Graham-McDermett, Inc., Crosbyton, Tex., a corporation of Texas
Filed Sept. 21, 1961, Ser. No. 139,723
3 Claims. (Cl. 172—130)

This invention relates to agricultural implements and more particularly to row markers.

When land is being listed (and in other farm operations) it is desirable to mark the rows. Specifically, if the tractor does not follow rows then existing in the field it is desirable to mark the path of the tractor for the succeeding traverse of the field.

When listing, it is more desirable to have the marker attached to the tool bar carrying the plows than attached to the front of the tractor. The plows on the tool bar do not follow exactly the front of the tractor. This problem is acute when the rows are curved.

The problem of activating and inactivating the marker on either side of the tractor is magnified by the greater width of swath covered at a time. For example, if the tractor carries three plows, the center of the tractor is two rows from the location of the nearest furrow previously plowed. However, if the tractor carries five plows, the center of the tractor is three rows from the furrow previously plowed. The increased distance makes necessary an increased length of the marker beam. As the beam is longer it is necessary to make it sturdier which increases the weight. With increased weight additional power is necessary to raise and lower the beams.

We have invented a marker mounted on the tool bar which is power operated. Hydraulic power from the tractor is used to raise and lower the marker.

An object of this invention is to provide an improved power operated row marker for agricultural implements.

Another object of this invention is to provide a row marker supported independently from the marker raising mechanism when it is in the marking position.

Another object is to provide a row marker which easily is attached to and detached from the tool bar.

Another object is to provide a row marker which accurately marks the position the tractor is to follow on succeeding traverses of the land.

A further object is to provide a row marker which is adjustable as to width.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a back view of the mechanism according to this invention shown mounted on a tractor with tool bar and listers shown in phantom.

FIG. 2 is an elevation of the hydraulic cylinder frame with associated equipment shown schematically.

FIG. 3 is a sectional view taken on line 3—3 of FIG. 2.

Figure 4:
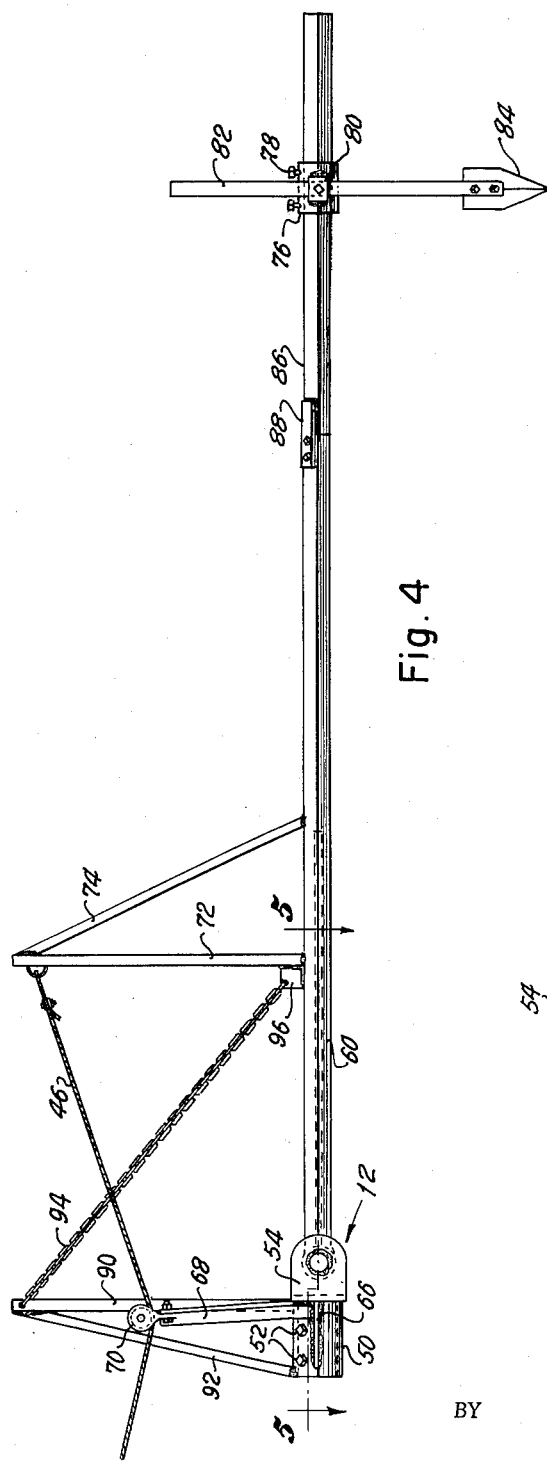
FIG. 4 is an elevation of the marker beam and its clamp.
Figure 5:
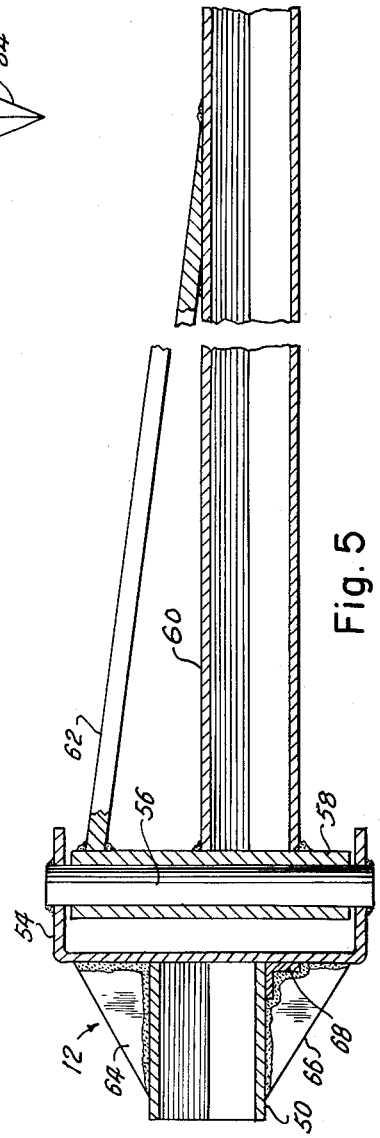
FIG. 5 is a sectional view taken on line 5—5 of FIG. 4.

As may be seen in the accompanying drawings, the marker has been illustrated attached to tractor 18 carrying five lister bottoms 16. It will be understood that the marker is adaptable for any farming operations where it is desired to mark the path of the tractor on a future traverse and is not limited to listing.

The marker consists basically of three units: the frame unit 10, and two beam units 12. Each of the units is clamped to the tool bar 14 which carries the lister bottoms 16. The tool bar 14 is attached to the tractor 18 in a well known manner. The tractor 18 will include a source of pressurized hydraulic fluid 20 with control 22. This is standard, conventional equipment on modern farm tractors.

The frame unit 10 (FIG. 2) includes horizontal bar 24. Uprights 26 are welded to each end of the bar 24. Two straps 28 connect the upper ends of the uprights 26, thus the rectangular frame 10 is formed. Two clamps 30 are attached to the lower side of the bar 24. The clamps 30 are conventional type clamps used in agricultural equipment to attach various units to tool bars. They form means to attach securely the frame 10 to the tool bar 14 so that the bar 26 is horizontal and parallel to the tool bar.

Ear 32 is welded to one upright 26. Hydraulic cylinder 34 is pivoted to the ear 32 by a pin extending through one end of the cylinder and a hole in the ear 32. Piston rod 36 is mounted for axial reciprocable movement within the cylinder 34. The position of the rod will be responsive to the pressurized hydraulic fluid as transmitted through hoses 38 which operatively connect the cylinder 34 to the control 22. Inasmuch as the operation of hydraulic-piston-cylinder units by controlled pressurized hydraulic fluid is well known it will not be further discussed here except to state that the position of the piston rod 36 is responsive to the control unit.

Lever 40 is pivoted between the straps 28 by bolt 42 extending through holes in the straps 28 and the lever 40 intermediate their ends. At the lower end of the lever 40 there is a hole through which passes a bolt also passing through holes in clevis 39 on the end of rod 36. Thus, it may be seen that the piston rod 36 is pivoted to lever 40 which itself is pivoted to the frame 10. Loop 44 is welded to the upper end of the lever 40. Line 46 is shackled to the loop 44. The line 46 includes two cables, one extending to the right hand marker beam unit 12, the other extending to the left hand marker beam unit 12. Although there are two individual cables, inasmuch as they each are attached to the loop 44 they are considered a single line 46.

The two marker beam units 12 are identical except one is a right handed unit and the other a left handed unit. The units are attached by clamp 50 to each end of the tool bar 14. Each clamp 50 includes a tubular member which telescopes over the tool bar 14. It is secured in place by two set screws 52. U-member 54 is welded to the clamp 50. Axle 56 is welded between the arms of U-member 54. The axle 56 is horizontal and normal to the tool bar 14. Tube 58 is journaled around the axle 56. Marker beam 60 is welded to the tube 58. The marker beam 60 is braced by brace 62 on the leading edge. The brace 62 is welded to the leading edge of the tube 58 and it is welded to the marker beam 60. Gussets 64 and 66 are welded between the clamp 50 and the U-member 54 on the leading and trailing edges respectively. They brace the U-member 54.

Column 68 is welded to the gusset 66 and extends upward therefrom. Thus the column 68 is attached to the clamp 50. Pulley 70 is attached to the top of the column 68. Line 46 is reeved through the pulley 70. Post 72 is attached to the top of the beam 60. Brace 74 extends from the top of the post 72 to the beam 60. Line 46 is shackled to the top from the post 72.

Clamp 76 telescopes over the beam 60 near the outer end thereof. The clamp 76 is held securely in place by one or more set screws 78. The clamp 76 includes loop 80 through which slides shank 82 of marker plow 84. The axis of the shank 82 and of the loop 80 is vertical when the marker beam 60 is in the horizontal or operating position. It will be understood that any sort of a tool to plow a shallow furrow or to scar the surface of the earth could be used as marker plow 84.

For example, a disc type marker could be used and they likewise could be mounted upon shank 82 as illustrated. It readily will be understood by those skilled in the art that the position of the marker plow 84 can be adjusted as to width by loosening the set screws 78 and sliding the clamps 76 to the desired width. Plow 84 may be adjusted vertically by loosening the set screw in the loop 80 and adjusting the shank 82 to the position desired.

The marker beam 60 is illustrated with extension 86. I.e., the marker beam is a composite one having the beam first portion indicated by the numeral 60 and extension 86 attached thereto by straps 88. The straps 88 could be any type connection, the particular type illustrated includes the straps 88 welded to extension 86 and bolted to beam 60. The exterior section of the extension 86 is identical with that of the first portion of the marker beam so that the clamp 76 may be used on any portion. It will be understood that if the additional width provided by the extension 86 is not needed it would not be used.

Post 90 and its associated brace 92 are welded to the clamp 50 and extend upward therefrom. The top of the post 90 has a hole for the attachment of chain 94 which extends to the marker beam 60 and is attached to a hole in gusset 96 which is welded between the marker beam 60 and the post 72. The length of the chain 94 is such that when the marker beam 60 is in the down or horizontal position it is maintained in the horizontal position by the chain 94. The line 46 does not support the full weight of the beam 60 when it is in the down position. Also chain 94 limits the travel of the beam 60 independently of the position of the lever 40.

The operation will be understood readily. When it is desired to raise one marker beam 60 and lower the other, the operator on the tractor merely moves control 22 to cause the hydraulic fluid to move the piston rod 36 to the opposite position. This causes the lever 40 to rotate thus reciprocating the line 46. The movement of the line 46 will raise the marker beam 60 which is in a horizontal position and slacken the line on the other side which will permit the beam 60 on the other side to rotate downward to the horizontal operating position by gravity.

It will be noted that the length of the line 46, the placement of the pulley 70, and the positioning of the post 72 must be such that the top of post 72, the pulley 70, and the pivot axis of the axle 56 are not in a straight line. If they were, additional movement of the line 46 would not cause rotation of the beam but would cause strain on parts of the mechanism.

As we consider the exact relationship of the pivot axis of axle 56, point of pulley 70, and height of post 72 of some importance, it will be noted that the post 72 extends upward so that the cable is shackled to the post about 24 inches above the beam 60 and the post is attached to the beam 60 about 26 inches from the axis of the axle 56. The column 68 is such a length that the pulley 70 is approximately 12 inches above the elevation of the top of the marker beam 60 and it is about 4 inches inboard from a vertical plane through the axis of axle 56.

Thus it may be seen that we have provided a marker which may be quickly clamped to the existing tractor tool bar and the hydraulic system attached to the existing system of the tractor for simple power operation.

It will be apparent that the embodiment shown is only exemplary and that various modifications can be made in construction, materials, and arrangement within the scope of the invention as defined in the appended claims.

We claim as our invention:

1. A marker to be attached to a horizontal tool bar of a tractor, said tool bar having plows attached thereto, and said tractor having a supply of hydraulic fluid under controlled pressure; comprising the combination: a frame, said frame having at least two clamps thereon, each of said clamps encircling said tool bar thus clamping the frame thereto, said frame having a hydraulic cylinder pivoted to it, said hydraulic cylinder being connected to said supply of hydraulic fluid, a piston rod within the cylinder which moves axially within the cylinder responsive to the pressure of the hydraulic fluid, a lever pivoted to said frame, said piston rod pivoted to said lever so that movement of the rod relative to the cylinder will impart rotational motion to the lever; a line extending the length of the tool bar, said line being connected to said lever so that movement of the piston rod causes reciprocal movement of the line through the lever; two marker beams, one of said marker beams on each end of the tool bar, each marker beam pivoted to a marker clamp, each marker clamp clamped to the tool bar, said pivot between each marker beam and marker clamp having a horizontal axis normal to the tool bar so that each marker beam may be rotated from longitudinally of the tool bar to angle upward from the tool bar, a column rigidly attached to each marker clamp and extending above said marker clamp, a pulley at the top of each column, a post rigidly attached to each marker beam, and extending above said marker beam when it is in the horizontal position, and a plow attached to each marker beam in earth working engagement when that marker is approximately horizontal, thus making a mark which the operator of the tractor may follow later; said line extending through both pulleys and attached to both posts so that reciprocation of the line causes rotational movement of one marker beam upward and allows rotational movement of the other marker beam downward by gravity.

2. The invention as defined in claim 1 with the addition of a clamp post attached to each clamp extending upward from said clamp, and a chain attached to the top of said clamp post and extending to said marker beam so as to limit the downward rotation of marker beam to approximate horizontal position.

3. The invention as defined in claim 1 with the addition of an extension extending longitudinally from said marker beam, said extension being of the same cross-section as said marker beam, said extension being removably attached to said marker beam so as to give a greater range of distances to which the means for the scarring of the earth may be attached from the end of the tool bar.

References Cited in the file of this patent

UNITED STATES PATENTS

| 184,389 | Mangett | Nov. 14, 1876 |
| 1,058,054 | Hallenbeck | Apr. 8, 1913 |
| 2,979,136 | Oehler | Apr. 11, 1961 |

FOREIGN PATENTS

| 1,212,441 | France | Mar. 23, 1960 |